UNITED STATES PATENT OFFICE.

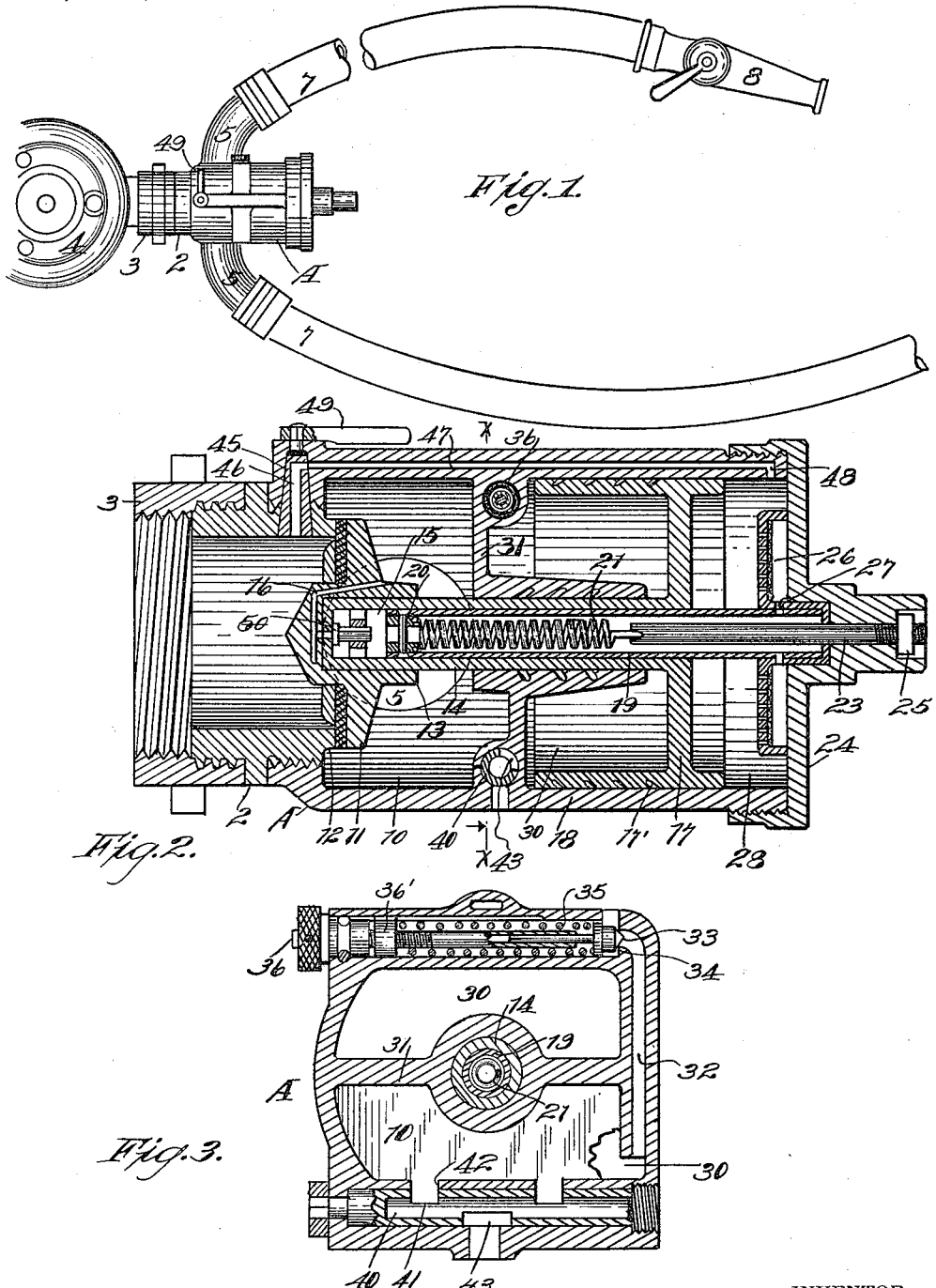

WILLIAM H. GLEESON, OF SAN FRANCISCO, CALIFORNIA.

AUTOMATIC PRESSURE-REDUCING AND THROTTLE VALVE.

1,151,262. Specification of Letters Patent. Patented Aug. 24, 1915.

Application filed March 3, 1913. Serial No. 751,749.

*To all whom it may concern:*

Be it known that I, WILLIAM H. GLEESON, a citizen of the United States, residing in the city and county of San Francisco and State of California, have invented new and useful Improvements in Automatic Pressure-Reducing and Throttle Valves, of which the following is a specification.

This invention relates to automatic valves and particularly to an improved reducer and throttle valve.

The object of the present invention is to provide a reliable pressure-reducing and regulating valve, whereby the pressure of fluid in high pressure water systems and other adaptations may be reduced to a definite lesser degree; the valve having parts automatically operable to increase or decrease the flow of water through the valve in proportion to the demand for water, and having an auxiliary, adjustable controlling device for varying the pressure between maximum and minimum of the water passing through the valve.

A further object of the invention is to provide a valve automatically operable to reduce water from a high to a low pressure, and deliver a variable quantity of water at a constant lesser pressure, said valve being provided with means whereby it may be adjusted to deliver the flow or high pressure of the water supply on demand.

It is also an object to provide in combination, a tap, hydrant or other discharge connection of a high pressure water system, and an automatically operable valve for reducing the high pressure to a lower pressure, said valve operating in combination with one or more discharge valved hose, the valve being designed for automatically reducing the volume of water passing therefrom in proportion to the demand on the connected hose.

The invention consists of the parts and the construction and combination of parts as hereinafter more fully described and claimed, having reference to the accompanying drawings, in which—

Figure 1 is a view showing the improved valve in combination with a hydrant and delivery hose. Fig. 2 is a longitudinal, central, sectional view through the valve. Fig. 3 is a transverse sectional view on line x—x, Fig. 2.

In its illustrated embodiment the improved valve comprises a body portion A, having a nipple or connection 2 coaxial with the body and upon which is turnably secured a swiveling ring 3, by which the valve may be connected to a hydrant 4 of a water system; the present valve being particularly designed to operate in conjunction with high pressure water systems.

From sides of the cylindrical chamber or body portion A there projects a plurality of elbows 5, having external screwthreads at their ends for coupling with hose 7, which, in the present case, is shown as provided with shut-off nozzles 8, so that the stream from the hydrant can be played or cut off at will. The elbows 5 communicate through large apertures directly into a distributing chamber 10. In the chamber 10 is movable a disk or other suitable valve adapted to approach the inwardly projecting seat portion 12 of the bushing or nipple 2, so as to cut off the water or to move away from the same for the admission of a larger volume of water into the distributing chamber 10 of the valve.

Removably fitting a boss 13 of the valve is a piston stem 14, longitudinally chambered, as at 15; water being admitted to the chamber through one or more ducts 16 in the valve 11. The ducts 16 open into the distributing chamber 10 so that water will pass through the ducts into the chamber 15, through which it may flow. The stem 14 carries a diaphragm or piston 17, preferably of greater diameter than the inlet passage of the nipple 2; the piston 17 having a running fit with a piston chamber 18 of the valve and being provided with peculiar circumferential, undercut grooves 17′ having the function of forming a leak-resistive water packing.

Slidably fitting within the stem 14 is a tube 19 having secured at its lower end a nut or spring-receiving device 20, to which is secured the contiguous end of a contractile spring 21. The opposite end of the contractile spring 21 is mounted on a screw or plunger 23 extending into the tube 19 and having a bearing in the head 24 of the valve. The uppermost end of the screw 23 is exposed and has a nut 25, or other device, to which a tool may be applied for moving the screw for the purpose of increasing or decreasing the tension of the spring 21, which acts through its connection 20 against the tube 19 to draw the latter upwardly against the head 24; the pressure of the upper end of the sleeve 19 being utilized in the present instance to clamp a suitable screen 26 beneath the lower surface of the head 24. The screen 26 acts to prevent the admission of particles of material from the chamber 15 in the stem 14 and tube 19 through an aperture 27 formed adjacent to the upper end of the tube for the purpose of conveying water from the distributing chamber through the ducts 16, chamber 15 into a pressure chamber 28 above the piston 17.

In operation, when the valve has been connected to a source of supply, as the hydrant 4, and to it has been attached the discharge hose 7, when the valve of the hydrant is opened water under pressure passes from the hydrant into the distributing chamber 10 of the valve by forcing the valve 11 off of the seat. Assuming that the shut-off nozzles 8 are open or partly open for a play of streams, as soon as the hose become filled with water this will back up to a certain predetermined pressure in the chamber 10 and then water will begin to force its way through the ducts 16 into chamber 15; thence moving through the tube 19 will issue at the aperture 27 thereof into the piston chamber 28, where pressure will accumulate until approximately equal to the pressure in the distributing chamber 10. After these pressures have equalized, a slight leakage will occur around the circumference of the piston 17 and collect in the exhaust, drain or variable pressure chamber 30, beneath the piston 17 and above a diametral bearing wall 31, which separates the piston chamber 28 from the distributing chamber 10. When the higher pressure of water in the hydrant forces open the valve 11, this moves against the contiguous end of the piston stem 14 in its boss 13 so that the piston 17 will be shifted away from the wall 31 a distance substantially equal to that at which the valve disk 11 has moved away from its seat 12.

Assuming that the automatic valve is applied to a high pressure system in which the water in the hydrant 4 has a pressure of say three hundred pounds, the normal minimum discharge pressure of water in the distributing chamber 10 can be predetermined by the ratio of the diameters, as between the piston 17 and the passageway through the valve seat or nipple 2. If it be desired to reduce the high pressure to one more controllable, as for instance one hundred pounds, at the nozzles, then the area of the piston 17 would be approximately twice the area of the passageway through the valve seat 12, so that when the one hundred pounds pressure had accumulated in the distributing chamber 10 of the reducer, and through communication by the ducts 16 and the chamber 15 and the aperture 27, the same pressure of water would accumulate in the piston chamber 28. Then the area of the disk valve 11 exposed to one hundred pounds pressure plus the area of the piston 17, also exposed to one hundred pounds pressure per square inch, would balance the three hundred pounds pressure on the hydrant side of the valve 11 and this valve would be held in such a position away from its seat 12 as would admit such a quantity of water as would be desired at the hose nozzles.

In order to prevent the accumulation of back pressure in the chamber 30, below the piston 17, and thereby prevent the automatic operation of the piston 17, the chamber 30 is provided with a communication to the atmosphere so that the water escaping or leaking around the piston 17 and accumulating in the chamber 30 would constantly drain away. To that end, the transverse wall 31, below the piston, is provided with a drain or aperture 32 which passes through the wall of the valve to the atmosphere. In the event it is desired to cause the discharge of water from the nozzles 8 at full hydrant pressure, say three hundred pounds, then the escape of water from the drain 32 would be almost totally prevented by means of a plug 33, movable against a seat 34 at the drain 32 by a spring 35, the pressure of which can be controlled by a screw or other equivalent device 36.

The purpose of the introduction of the spring, between the plug 33 and the screw 36, is to permit the plug to yield when the reducing valve is in its normal pressure-reducing operation, but when it is desired to prevent the escape of water from the chamber 30 through the drain 32, then the screw 36 is turned sufficiently to compress the spring 35 to such a degree that it will hold the plug 33 against its seat 34 until the pressure in the distributing chamber approaches the pressure in the hydrant; the spring being provided to permit the automatic opening of the plug 33 under the maximum pressure from the hydrant.

Another important function of the automatic release valve 33 and its controlling spring 35 is that by the adjustment of the screw 36 a nut 36' will be advanced or receded to increase or decrease the pressure of the spring 35, so that the valve 33 will seat with desired force and cause a back pressure in the variable pressure chamber 30 and by this method produce any desired pressure at the discharge connections between the minimum reduced pressure and the maximum pressure in the hydrant. A further important function of the auxiliary relief valve 33 is to insure that a constant drain of water from the chamber 30 can occur; the draining water being that which constantly and designedly leaks or escapes past the surface of the piston 17 into the chamber 30 and also through the grooved, water packed bearing of the wall 31 in which the stem 14 slides. This constant leakage is a desirable feature of this invention in that the constant circulation of water through the chambers 28 and 30, and between the piston 17 and its cylinder 18, prevents possible freezing of the water in that portion of the apparatus where, if the circulation were not provided for, the still water would be liable to freeze at times.

While I have shown the improved throttle valve as provided with two hose elbows 5 so that two streams may be played from the hose 7, it is understood that any suitable number of hose elbows 5 may be provided. During the discharge of water from the hose should any one of these be cut off, the immediately succeeding, momentary increase of pressure in the distributing chamber 10 would result in an increment of pressure in the pressure chamber 28 above the piston. This would be forced downwardly, moving down the valve 11, because the aggregate pressures momentarily increased in the chambers 10 and 28 against the valve 11 and piston 17 would be greater than the pressure in the hydrant 4. Again, if one or all of the nozzles playing streams from the hydrant be cut off, then the further increase of pressure in the chamber 10 would result in an increment of pressure in the chamber 28, whereupon the aggregate pressures on the valve 11 and the piston 17 becoming again greater than the pressure of the hydrant 4, the valve 11 would be forced toward the seat 12 to automatically reduce and substantially cut off the inflow of water from the hydrant. Conversely for any increase of demand of water at the nozzles 8, then the immediate, consequent reduction of pressure in the distributing chamber 10 of the reducing valve would permit the greater pressure in the hydrant against the face of the valve 11 to move the valve away from the seat 12 for the admission of a larger volume of water.

From the foregoing it will be seen that I have provided a substantial, reliable, automatically operable reducing and throttle valve for efficient operation in connection with high pressure water systems.

For the purpose of preventing hammering of the valve 11 in its operations, I so proportion the parts that the absolute seating of the valve 11 is prevented because of a constant leakage of water under pressure from the hydrant 4 past the valve 11 when it is adjacent to the valve seat 12, this leakage being effected by escape along the piston 17 to chamber 30, thence past the yieldable valve 33. The leakage water passes through the ducts 16, chamber 15 and its aperture 27 to the pressure chamber 28 from which it flows gradually past the piston 17 into chamber 30 and through the vent or escape port 32 and thence past the yieldable adjustable relief valve 33 to the atmosphere. This means of preventing the valve 11 from positively seating also has the beneficent result of keeping particles of sand and gravel from being crammed between the valve 11 and its seat 12. The leakage water effectually carries away such foreign substances as may tend to accumulate beneath and embed in a cushion on the face of the valve 11.

Since the plunger 23, on which is mounted the screw 22 secured to the upper end of the spring 21, is slidable in its bearing in the cap or head 24, when the hydrant valve is open the pressure of water in the chamber 15, acting against the unbalanced inner end of the plunger 23, tends to force this outwardly, the movement being in proportion to the pressure in the distributing chamber 10. This movement of the head of the plunger 23 can be utilized as a means for indicating the amount of pressure occurring at divers instances in the distributing chamber 10.

By the provision of the vent or escape port 32, the water under the piston 17 in chamber 30 may be quickly expelled, when the piston 17 moves downwardly at such periods as an increase of pressure occurs in the distributing chamber 10 during the playing of streams from the hose, and the piston 17 is permitted to move down and cut off the incoming water from the hydrant at considerable speed, but hammering of the valve 11 against the seat 12 is prevented by reason of the resistance of the higher pressure from the hydrant acting against the valve 11, between which and the seat 12 the high pressure water will leak into the chamber 10 which is exhausted, as before described, through the vent 32. On the contrary the rapid opening of the valve 11, under pressure from the hydrant, is prevented by providing the piston 17 with means for obtaining a water packing consisting of the grooves 17' which are especially designed to reduce to a minimum the leakage of water past the cylinder chamber 18.

For the purpose of exhausting the fluid which may remain in the hose after the nozzles have been shut down and the valve member 11 substantially closed, a suitable relief or vent valve, indicated at 40, is mounted in the casing and has ports 41 communicating with ducts 42 leading into the distributing chamber and the valve having an escape port 43; the ports of the valve 40 being adapted for registration with their respective ports when the valve is disused. This means affords relief to the hose of the pressure of entrapped fluid when the several controlling devices of the hydrant and hose are closed.

The flow of water or other fluid through the valve apparatus can be almost instantaneously cut off without manipulating the usual controlling device of the hydrant at such times as it may be expedient to do so. This quick shutting down I accomplish by providing at the inlet side of the valve body a small by-pass valve 45 fitting and turnable in the casing and opening directly into the high pressure chamber in the valve seat or nipple 2; the duct 46 of the by-pass valve communicating with a chamber 47 formed along the side of the body of the valve casing and extending up to and communicating with the pressure or cylinder chamber 28, as at 48. When it is desired to quickly cut out the throttle valve, the operator simply turns the by-pass valve 45 by its lever 49, thus admitting the full pressure of water from the hydrant through the channel 47 into the piston chamber 28, through which it will act through the communicating aperture 27 of the tube 19 and in the chamber 15 upon a valve 50 at the lower portion of the stem 14. The valve 50 is adapted to close the duct 16, whereupon the accumulated high pressure in the chamber 28 will force the piston 17 downwardly against its associated valve member 11, forcing the latter to hermetically close upon its seat 12. By the provision of this by-pass I am enabled to instantly cut out the throttle valve without manipulating the hydrant valve.

The valve is preferably so attached to the hydrant that the auxiliary controlling valve is uppermost, and as the escape duct 32 is extended well down the wall its mouth is near the bottom of the chamber 30. The purpose of this is to entrap air in the upper part of the variable pressure chamber to obtain an air cushion upon which sudden pressures thrown into the chamber can be elastically taken up and thus cause the pressure to act gradually on the vent valve 33.

Having thus described my invention, what I claim and desire to secure by Letters Patent is—

1. A pressure-reducing valve adapted for connection to a source of supply and having means for the attachment of discharge connections, and means for automatically reducing liquid pressure from the supply side to a lower pressure upon the discharge side, said means consisting of a movable valve part subjected to accumulated pressures from the discharge side of the valve whereby the part will be moved automatically to produce the desired ratio between the pressures and a means for permitting and controlling leakage past said part at variable pressures.

2. A pressure-reducing valve adapted for connection to a source of supply and having means for the attachment of discharge connections, means for automatically reducing liquid pressure from the supply side to a lower pressure upon the discharge side, said means consisting of a movable valve part subjected to accumulated pressures from the discharge side of the valve whereby the latter will be moved automatically to produce the desired ratio between the pressures, and an auxiliary valve for controlling said part whereby pressures intermediate between the high pressure of the supply and the minimum low pressure of discharge from the valve can be obtained.

3. A pressure-reducing valve adapted for connection to a source of supply and having means for the attachment of discharge connections, means for automatically reducing liquid pressure from the supply side to a lower pressure upon the discharge side, said means consisting of a movable valve closure subjected to accumulated pressures from the discharge side of the valve whereby the latter will be moved automatically to produce the desired ratio between the pressures, an auxiliary valve and a portion controlled thereby and coöperating with the valve closure whereby pressures intermediate between the high pressure of the supply and the minimum low pressure of discharge from the valve can be obtained, said auxiliary valve being adapted for adjustment to hold the discharge pressure of the reducing valve approximately equal to the pressure of the source of supply.

4. In an automatically operable, pressure-reducing valve, a valve body having means for connection to a source of supply and having discharge connections, a valve movable within the casing to control the passage of water from the supply to the discharge, a seat in the casing for the valve, a piston coöperative with the valve, said casing having a distributing chamber in which the valve is movable and a piston chamber in which the piston is movable, means for providing for the equalization of pressure between the distributing chamber and the piston chamber, said piston and valve being designed to operate to reduce the pressure automatically at the discharge connections to a desired ratio with relation to the supply pressure and an air chamber below the piston for taking shocks.

5. In an automatically operable, pressure-reducing valve, a valve body having means for connection to a source of supply and having discharge connections, a valve movable within the casing to control the passage of water from the supply to the discharge, a seat in the casing for the valve, a piston coöperative with the valve, said casing having a distributing chamber in which the valve is movable and a piston chamber in which the piston is movable, means for providing for the equalization of pressure between the distributing chamber and the piston chamber, said piston and valve being designed to operate to reduce the pressure automatically at the discharge connections to a desired ratio with relation to the supply pressure, and means for providing for a constant circulation of water from the distributing chamber and piston chamber to the atmosphere.

6. In an automatically operable, pressure-reducing valve, a valve body having means for connection to a source of supply and having discharge connections, a valve movable within the casing to control the passage of water from the supply to the discharge, a seat in the casing for the valve, a piston coöperative with the valve, said casing having a distributing chamber in which the valve is movable and a piston chamber in which the piston is movable, means for providing for the equalization of pressure between the distributing chamber and the piston chamber, said piston and valve being designed to operate to reduce the pressure automatically at the discharge connections to a desired ratio with relation to the supply pressure, and means for providing for a constant circulation of water from the distributing chamber and piston chamber to the atmosphere, whereby the freezing of water between the movable piston and its complementary wall of the casing is avoided.

7. In an automatically operable, pressure-reducing valve, a valve body having means for connection to a source of supply and having discharge connections, a valve movable within the casing to control the passage of water from the supply to the discharge, a seat in the casing for the valve, a piston coöperative with the valve, said casing having a distributing chamber in which the valve is movable and a piston chamber in which the piston is movable, means for providing for the equalization of pressure between the distributing chamber and the piston chamber, said piston and valve being designed to operate to reduce the pressure automatically at the discharge connections to a desired ratio with relation to the supply pressure, and means for providing for a constant circulation of water from the distributing chamber and piston chamber to the atmosphere, whereby the valve is prevented from hammering when approaching its seat to substantially cut off the flow through the valve.

8. In an automatically operable reducing valve controlled by pressure on the discharge side, a valve casing having means for connection to a source of supply, a distributing chamber with outlets, a valve movable in said chamber to cut off admission of fluid thereinto, a piston cylinder, a piston within said cylinder and having a coöperative relation with said valve, the diameter of said piston being proportioned to permit the accumulation of a desired fluid pressure in the reducing valve, means providing for the communication of pressure from the distributing chamber to the piston chamber, a fixed part intervening between the piston chamber and the distributing chamber, and an auxiliary controlling device for controlling the volume of leak past the movable piston, whereby the pressure of water in the discharge chamber can be varied between the maximum and minimum, said auxiliary controlling device operating to permit the constant circulation of fluid around said piston to prevent sticking or freezing of the latter.

9. In an automatically operable throttle valve having a casing with an inlet aperture and a discharge, a distributing chamber, a valve interposed between the discharge and the intake operable in the distributing chamber, a differential piston movable in the casing and subjected to pressure equal to that in the distributing chamber and adapted to hold the valve against movement when the pressure in the distributing chamber reaches the desired ratio as to the pressure at the inlet side, said piston being automatically operable by the fluid pressure to open and close with variations of pressure in the distributing chamber whereby the volume of water passing through the discharge of the throttle valve is automatically controlled in proportion to the demands, a valved wall interposed between the piston and the valve and forming a variable pressure chamber, and a valve for controlling pressure therein.

10. In an automatically operable throttle valve having a casing with an inlet aperture and a discharge, a distributing chamber, a valve interposed between the discharge and the intake operable in the distributing chamber, a differential piston movable in the casing and subjected to pressure equal to that in the distributing chamber and adapted to hold the valve against movement when the pressure in the distributing chamber reaches the desired ratio as to the pressure at the inlet side, said piston being automatically operable by the fluid pressure to open and close with variations of pressure in the distributing chamber whereby the volume of water passing through the discharge of the throttle valve is automatically controlled in proportion to the demands, and an indicator or plunger projecting into the casing of the throttle valve and movable by unbalanced pressure therein and having an exposed portion.

11. In an automatically operable throttle and reducing valve having a suitable body portion, means for connecting the valve to a source of supply, a distributing chamber having discharges to which may be connected conductors, a valve member movable in the distributing chamber and seatable over the inlet means, a piston movable in the valve casing and having a connection with the valve disk in the distributing chamber, means for providing for an equalization of pressure in the chamber above said piston and the distributing chamber, a part dividing the piston chamber from the distributing chamber, said piston being sensitive to variations of pressure in the distributing chamber and operable to permit the opening or closing of the valve member to maintain a desired pressure in the distributing chamber, and a valve for controlling the position of the piston by maintaining a pressure therebelow.

12. In an automatically operable throttle and reducing valve having a suitable body portion, means for connecting the valve to a source of supply, a distributing chamber having discharges to which may be connected conductors, a valve member movable in the distributing chamber and seatable over the inlet means, a piston movable in the valve casing and having a connection with the valve disk in the distributing chamber, means for providing for an equalization of pressure in the chamber above said piston and the distributing chamber, a part dividing the piston chamber from the distributing chamber, said piston being sensitive to variations of pressure in the distributing chamber and operable to permit the opening or closing of the valve member to maintain a desired pressure in the distributing chamber, and a device for controlling and maintaining leakage past the piston, said piston being adapted for relatively slow outward movement to permit the gradual opening of the valve member in the distributing chamber and being adapted for a relatively fast movement to close the valve member.

13. In an automatically operable throttle and reducing valve having a suitable body portion, means for connecting the valve to a source of supply, a distributing chamber having discharges to which may be connected conductors, a valve member movable in the distributing chamber and seatable over the inlet means, a piston movable in the valve casing and having a connection with the valve disk in the distributing chamber, means for providing for an equalization of pressure in the chamber above said piston and the distributing chamber, a part dividing the piston chamber from the distributing chamber, said piston being sensitive to variations of pressure in the distributing chamber and operable to permit the opening or closing of the valve member to maintain a desired pressure in the distributing chamber, and a device for controlling and maintaining leakage past the piston, said piston being adapted for relatively slow outward movement to permit the gradual opening of the valve member in the distributing chamber and being adapted for a relatively fast movement to close the valve member, said controlling device being operable to maintain a constant leak of water around the piston and thereby prevent the positive seating and hammering of the valve member in the distributing chamber.

14. In combination with a source of fluid supply and distributor conductors, an automatically operable, pressure-reducing and throttle valve connectible to the source of supply and to which the conductors are attachable, said valve having a valve member for admitting or cutting off a flow of water from the supply, a piston for moving said member to its seat and for maintaining approximately a desired pressure of fluid in the valve and whereby the volume of water admitted to the valve is automatically reduced or increased in proportion to the demands on the supply conductors, a chamber for the piston in communication with the discharge side of the valve, and an auxiliary pressure controlling device for said chamber whereby the movement of said piston can be regulated to obtain a pressure variable between the minimum pressure normally produced by said piston and the maximum pressure at the source of supply, said auxiliary controlling device being automatically operable to permit the constant escape of fluid past the valve moving piston to prevent inoperation of the piston by freezing and to prevent the positive seating of the valve member.

15. In combination with a source of fluid supply and distributor conductors, an automatically operable, pressure-reducing and throttle valve connectible to the source of supply and to which the conductors are attachable, said valve having a valve member for admitting or cutting off a flow of water from the supply, a piston for maintaining approximately a desired pressure of fluid in the valve and whereby the volume of water admitted to the valve is automatically reduced or increased in proportion to the demands on the supply conductors, a tap drain whereby the supply conductors and the valve can be exhausted of fluid when the valve member is operative to cut off supply of fluid, and a variable pressure chamber forming an air cushion for absorbing shocks, with a leak duct extending from its lower portion, and a valve therefor.

16. A pressure-reducing valve adapted for connection to a source of supply and having means for the attachment of discharge connections, means for automatically reducing liquid pressure from the supply side to a lower pressure upon the discharge side, said means consisting of a movable valve subjected to accumulated pressures within the valve chamber whereby the valve will be moved automatically to produce the desired ratio between the pressures, and a by-pass and valve whereby the maximum pressure may be utilized for rendering the apparatus inoperative.

17. An automatically operating pressure reducing valve having a high pressure chamber, a discharge chamber adapted to communicate with the high pressure chamber, a valve disk controlling the flow of fluid from the high pressure to the discharge chamber, a chamber for containing a fluid at arbitrarily selected and constant pressure for operating the valve disk to control discharge pressure at the valve, a wall isolating the discharge chamber from the control chamber, and a piston operative by pressure in the control chamber and connected through the wall to the disk.

18. An automatically operating pressure reducing valve having a high pressure chamber, a discharge chamber adapted to communicate with the high pressure chamber, a valve disk controlling the flow of fluid from the high pressure to the discharge chamber, a compartment communicating with the discharge chamber, a chamber for containing a fluid derived from said compartment at arbitrarily selected and constant pressure, the differential pressures in said compartment and last named chamber operating the valve disk to control discharge pressure at the valve, an automatically operable, arbitrarily adjustable throttle for maintaining a predetermined pressure in the control pressure chamber, a wall isolating the control chamber from the discharge chamber, and a stem running through the wall and having a piston in the control chamber.

19. The combination in an automatically operating, pressure reducing valve having supply and discharge chambers, of a fluid pressure operated valve closure, a pressure chamber isolated from the discharge chamber by a wall for providing an air cushion reactive to render the closure sensitive to and readily movable by slight variations in its operating pressure, and a device manually adjustable and automatically operable to maintain an arbitrary fluid pressure in said isolated chamber for controlling the valve closure so that the latter will operate to vary the flow of fluid through the valve to produce the desired pressure on the discharge chamber side.

In testimony whereof I have hereunto set my hand in the presence of two subscribing witnesses.

WILLIAM H. GLEESON.

Witnesses:
JOHN H. HERRING,
W. W. HEALEY.

Copies of this patent may be obtained for five cents each, by addressing the "Commissioner of Patents, Washington, D. C."